US012687869B2

(12) United States Patent
Tyrrell

(10) Patent No.: US 12,687,869 B2
(45) Date of Patent: Jul. 21, 2026

(54) DIGITAL LOW DROPOUT REGULATOR

(71) Applicant: Renesas Design (UK) Limited, Bourne End (GB)

(72) Inventor: Julian Tyrrell, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 198 days.

(21) Appl. No.: 18/496,218

(22) Filed: Oct. 27, 2023

(65) Prior Publication Data

US 2025/0138560 A1 May 1, 2025

(51) Int. Cl.
*G05F 1/46* (2006.01)
*G05F 1/575* (2006.01)
*G05F 1/59* (2006.01)

(52) U.S. Cl.
CPC .............. *G05F 1/468* (2013.01); *G05F 1/575* (2013.01); *G05F 1/59* (2013.01)

(58) Field of Classification Search
CPC ............. G05F 1/468; G05F 1/575; G05F 1/59
See application file for complete search history.

(56) References Cited

U.S. PATENT DOCUMENTS

| | | | |
|---|---|---|---|
| 7,679,345 B1 | 3/2010 | Verma et al. | |
| 9,817,416 B2 | 11/2017 | Gebeyehu et al. | |
| 9,870,014 B1 | 1/2018 | Ham et al. | |
| 9,979,410 B2 | 5/2018 | Wang et al. | |
| 10,203,709 B1 | 2/2019 | Feng et al. | |
| 10,216,209 B1 * | 2/2019 | Ham | G05F 1/575 |
| 10,845,831 B2 | 11/2020 | Liu et al. | |
| 11,538,387 B1 | 12/2022 | Lee et al. | |
| 12,326,748 B2 | 6/2025 | Tornila Oliver et al. | |
| 2010/0164445 A1 | 7/2010 | Verma et al. | |
| 2014/0266103 A1 | 9/2014 | Wang et al. | |
| 2016/0282889 A1 | 9/2016 | Mahajan et al. | |
| 2017/0269620 A1 | 9/2017 | Duong et al. | |

(Continued)

OTHER PUBLICATIONS

X. Mao, Y. Lu and R. P. Martins, "A 1.2-A Calibration-Free Hybrid LDO With In-Loop Quantization and Auxiliary Constant Current Control Achieving High Accuracy and Fast DVS," in IEEE Transactions on Circuits and Systems I: Regular Papers, vol. 69, No. 11, pp. 4443-4452, Nov. 2022, doi: 10.1109/TCSI.2022.3198268. 10 pages.

(Continued)

*Primary Examiner* — Lakaisha Jackson
(74) *Attorney, Agent, or Firm* — SCULLY, SCOTT, MURPHY & PRESSER, P.C.

(57) ABSTRACT

A digital low dropout regulator (LDO) that receives a reference voltage and generates an output voltage. A comparison circuit of the LDO compares a reference voltage and a feedback voltage, and generates an error signal that is dependent on the comparison. A digital to analog converter of the LDO is operable in a panic mode in which the digital to analog converter receives the error signal, generates a DAC code signal, calculates a mean value of the generated DAC code signal, and sets the DAC code signal to the mean value. A panic circuit of the LDO detects when the feedback voltage exceeds a first threshold value or falls below a second threshold value, and controls the digital to analog converter to operate in the panic mode when the feedback voltage exceeds the first threshold value or falls below the second threshold value.

20 Claims, 13 Drawing Sheets

(56) References Cited

U.S. PATENT DOCUMENTS

| | | | |
|---|---|---|---|
| 2018/0267480 | A1 | 9/2018 | Mahajan et al. |
| 2018/0292851 | A1* | 10/2018 | Mahajan ............. H02M 1/0045 |
| 2019/0064860 | A1* | 2/2019 | Cho .......................... G05F 1/56 |
| 2019/0204862 | A1* | 7/2019 | Feng ......................... G05F 1/59 |
| 2021/0165437 | A1 | 6/2021 | Nasir et al. |
| 2022/0308611 | A1* | 9/2022 | Kim .......................... G05F 1/59 |
| 2022/0327209 | A1 | 10/2022 | Schat |
| 2022/0397926 | A1 | 12/2022 | Bonomi |
| 2024/0248504 | A1 | 7/2024 | Vargas et al. |
| 2025/0036150 | A1 | 1/2025 | Hung et al. |

OTHER PUBLICATIONS

J. Liu and N. Maghari, "A fully-synthesizable 0.6V digital LDO with dual-loop control using digital standard cells," 2016 14th IEEE International New Circuits and Systems Conference (NEWCAS), Vancouver, BC, Canada, 2016, pp. 1-4, doi: 10.1109/NEWCAS.2016.7604791. 4 pages.

US Non-Final Office Action dated Jul. 23, 2025 issued in U.S. Appl. No. 18/496,342.

US Office Action dated Nov. 28, 2025 issued in U.S. Appl. No. 18/496,138.

Notice of Allowance dated Apr. 29, 2026 received in U.S. Appl. No. 18/496,138.

* cited by examiner

| | left | right | delta | min | max | pp | mean | rms | acrms | freq | period | integral |
|---|---|---|---|---|---|---|---|---|---|---|---|---|
| Cursors | 101.22e-6 | 101.31e-6 | 90.047e-9 | | | | | | | | | |
| ☐ V(gate) | 1 | 1 | 0 | 1 | 1 | 0 | 1 | | | | | 90.047e-9 |
| ☐ V(vout) | 499.74e-3 | 500e-3 | 258.66e-6 | 499.73e-3 | 500.37e-3 | 631.96e-6 | 500.08e-3 | 500.08e-3 | 178.61e-6 | | | 45.031e-9 |
| ☐ V(qq) | 4 | 5 | 1 | 3 | 7 | 4 | 4.99062 | 5.1229 | 1.15662 | 12.5e+6 | 80e-9 | 499.39e-9 |
| ☐ V(qqfine) | 11 | 12 | 1 | 10 | 14 | 4 | 11.9906 | 12.0463 | 1.15662 | 12.5e+6 | 80e-9 | 1.0797e-6 |
| ☐ I(A1) | 48.25e-3 | 59e-3 | 10.75e-3 | 37.5e-3 | 80.5e-3 | 43e-3 | 58.899e-3 | 60.197e-3 | 12.434e-3 | 12.5e+6 | 80e-9 | 5.3037e-9 |
| ☐ V(iavg) | 56.39e-3 | 56.61e-3 | 220e-6 | 56.13e-3 | 57.81e-3 | 1.68e-3 | 56.993e-3 | 56.997e-3 | 608.59e-6 | | | 5.1321e-9 |

*Figure 8b*

DIGITAL LOW DROPOUT REGULATOR

The present disclosure relates to a digital low dropout regulator (LDO). In particular, the present disclosure relates to a digital LDO that is operable during a panic condition.

BACKGROUND

FIG. 1(*a*) shows a digital LDO 100 as is known in the prior art (Jun Liu et. al., A Fully-Synthesizable 0.6V Digital LDO with Dual-Loop Control using Digital Standard Cells, 2016 14th IEEE International New Circuits and Systems Conference (NEWCAS), Vancouver, BC, Canada, 2016, pp. 1-4).

The LDO 100 comprises a main comparator 102; shift-registers 104, 106; a counter 108; a buffer 110; transistors 112, 114, 116, 118; panic circuitry 120 comprising comparators 122, 124 and a logic block 126; clock circuitry 128 comprising a multiplexer 130 and a frequency scaler 132; and a capacitor Co having equivalent series resistance (ESR) Ro.

The LDO 100 uses a coarse digital to analog converter (DAC) 134 and a fine DAC 136, each driven from an up-down counter 104, 106 and a clock control scheme 128 that times a response to a 'panic' detected by the window comparator provided by the panic circuitry 120.

The main control loop is the single comparator 102 (or 1-bit ADC) that compares a feedback voltage VFB, that is derived from an output voltage VLDO, with a target voltage VREF.

The operation of the up-down counters 104, 106 acts as an integration function to an error signal CMP, so that the stability of the loop depends on the zero of the external decoupling capacitor Co, which has an ESR denoted by Ro.

When a "panic" is detected, i.e. the output voltage VLDO has exceeded the range as defined by the window comparator 120, the coarse and fine up-down counters 104, 106 are clocked at the full clock speed CLK, and the output current is ramped towards the new target value (either up or down) under control of the main comparator output CMP.

As the output of the DACs 134, 136 are essentially current sources provided by the transistors 112, 114, 116, 118, the output voltage VLDO is the integral of this current, so there is a 90° phase shift of the control to the output voltage VLDO. Typically, this results is a limit cycle of the DAC codes. As the capacitor Co has some ESR (denoted by Ro) the amplitude of the limit cycling reduces to a steady state. However, the "panic" mode fast clocking is a timed period, which in this example is 32 clock cycles. When the "panic" fast clocking timeout ends, the fine loop 136 is left to operate at 1/32nd of the clock speed.

The coarse and fine DAC outputs are controlled using a current mirror scheme. This has two benefits:

1. It keeps the switching operation and the dynamics of the LDO consistent, and the performance as expected.
2. It reduced the PSRR sensitivity of the output stage.

FIG. 1(*b*) is a schematic of a current mirror scheme 138 for controlling course and fine DAC outputs, as is known in the prior art (Xiangyu Mao et. al., A 1.2-A Calibration-Free Hybrid LDO With In-Loop Quantization and Auxiliary Constant Current Control Achieving High Accuracy and Fast DVS, IEEE Transactions on Circuits and Systems—I: Regular Papers, Vol. 69, No. 11, November 2022).

The current mirror scheme 138 comprises transistors 140, current sources 142, a capacitor 144, an amplifier 146 and a sink buffer 148.

SUMMARY

It is desirable to provide a digital LDO that has reduced limit cycling at the end of the fast clocking period, when compared to known systems.

According to a first aspect of the disclosure there is provided a digital low dropout regulator (LDO) for receiving a reference voltage and generating an output voltage comprising a comparison circuit configured to receive the reference voltage, receive a feedback voltage, the feedback voltage being dependent on the output voltage, compare the reference voltage and the feedback voltage, and generate an error signal that is dependent on the comparison between the reference voltage and the feedback voltage, a first digital to analog converter configured to be operable in a panic mode in which the first digital to analog converter is configured to receive the error signal, generate a first DAC code signal based on the error signal for a first time period, the output voltage being dependent on the first DAC code signal, and calculate a mean value of the generated first DAC code signal during at least a portion of the first time period, and set the first DAC code signal to the mean value as calculated, a panic circuit configured to detect when the feedback voltage exceeds a first threshold value or falls below a second threshold value, and control the first digital to analog converter to operate in the panic mode when the feedback voltage exceeds the first threshold value or falls below the second threshold value.

Optionally, the comparison circuit comprises a main comparator or a 1-bit analog to digital converter.

Optionally, the first digital to analog converter comprises a first shift register configured to generate the first DAC code signal.

Optionally, the first shift register comprises an up-down counter.

Optionally, the first digital to analog converter comprises a plurality of first current sources, wherein each of the first current sources functions as a bit of the first DAC code signal.

Optionally, each of first current sources comprises a first transistor.

Optionally, the first shift register comprises a plurality of outputs, each output being associated with a single bit of the first DAC code signal and coupled to a gate of one of the plurality of first transistors.

Optionally, the first digital to analog converter comprises a plurality of first buffer circuits, each output being coupled to the gate of one of the plurality of first transistors via a buffer circuit.

Optionally, each of the first buffer circuits comprises a first inverter.

Optionally, the digital LDO comprises an output capacitor having an equivalent series resistance, the first DAC signal being provided to the output capacitor to generate the output voltage.

Optionally, the first time period is a duration of time that the first digital to analog converter operates in the panic mode.

Optionally, the first digital to analog converter is configured to calculate the mean value of the generated first DAC code signal by measuring a peak value of the generated first DAC code signal, measuring a valley value of the generated first DAC code signal, and summing together the peak and valley values and dividing the sum of the peak and valley values by two.

Optionally, the peak value of the generated first DAC code signal is measured during a falling edge of the error signal and/or the valley value of the generated first DAC code signal is measured during a rising edge of the error signal.

Optionally, the peak value is measured during the last falling edge of the error signal before the end of the first time period and/or the valley value is measured during the last rising edge of the error signal before the end of the first time period.

Optionally, the panic circuit is configured to output a panic signal in response to the detection of the feedback voltage exceed the first threshold value or falling below the second threshold value, the panic signal being used to switch the first digital to analog converter to the panic mode.

Optionally, the panic circuit comprises a first comparator configured to compare the feedback voltage with the first threshold value and a second comparator configured to compare the feedback voltage with the second threshold value.

Optionally, the panic circuit comprises a logic circuit configured to receive outputs of the first and second comparators and to provide the panic signal in response to the first and second comparator outputs indicating that the feedback voltage has exceeded the first threshold value or has fallen below the second threshold value.

Optionally, the digital LDO comprises a counter circuit configured to receive the panic signal and the error signal, wherein the first digital to analog converter comprises a first shift register configured to generate the first DAC code signal, and the counter circuit is further configured to increment the first shift register during the first time period.

Optionally, the first time period is a duration of time that the first digital to analog converter operates in the panic mode.

Optionally, the digital LDO comprises a clock circuit configured to provide a clock signal to the comparison circuit.

Optionally, the first time period is a duration of time that the first digital to analog converter operates in the panic mode, the clock circuit is configured to operate in a fast mode during the panic mode by providing the clock signal at a first frequency, and operate in a slow mode, when not in the panic mode, by providing the clock signal at a second frequency, the second frequency being smaller than the first frequency.

Optionally, the clock circuit comprises a multiplexer for receiving an input clock signal and a frequency scaling unit, the clock circuit is configured to provide the input clock signal as the clock signal during the fast mode, and the frequency scaling unit is configured to reduce the frequency of the input clock signal in the generation of the clock signal during the slow mode.

Optionally, the digital LDO comprises a second digital to analog converter configured to receive the error signal, and generate a second DAC code signal based on the error signal, the output voltage being dependent on the second DAC code signal.

Optionally, the first digital to analog converter provides course control of the output voltage and the second digital to analog converter provides fine control of the output voltage.

Optionally, the second digital to analog converter comprises a second shift register configured to generate the second DAC code signal.

Optionally, the second shift register comprises an up-down counter.

Optionally, the second digital to analog converter comprises a plurality of second current sources, wherein each of the second current sources functions as a bit of the second DAC code signal.

Optionally, each of the second current sources comprises a second transistor.

Optionally, the second shift register comprises a plurality of outputs, each output being associated with a single bit of the second DAC code signal and coupled to a gate of one of the plurality of second current sources.

Optionally, the second digital to analog converter comprises a plurality of second buffer circuits, each output being coupled to the gate of one of the plurality of second current sources via a buffer circuit.

Optionally, each of the second buffer circuits comprises a second inverter.

Optionally, the digital LDO comprises an output capacitor having an equivalent series resistance, the first and second DAC signals being provided to the output capacitor to generate the output voltage.

Optionally, the panic circuit is configured to output a panic signal in response to the detection of the feedback voltage exceed the first threshold value or falling below the second threshold value, the panic signal being used to switch the first digital to analog converter to the panic mode.

Optionally, the panic circuit comprises a first comparator configured to compare the feedback voltage with the first threshold value and a second comparator configured to compare the feedback voltage with the second threshold value.

Optionally, the panic circuit comprises a logic circuit configured to receive outputs of the first and second comparators and to provide the panic signal in response to the first and second comparator outputs indicating that the feedback voltage has exceeded the first threshold value or has fallen below the second threshold value.

Optionally, the digital LDO comprises a counter circuit configured to receive the panic signal and the error signal, wherein the first digital to analog converter comprises a first shift register configured to generate the first DAC code signal, the second digital to analog converter comprises a second shift register configured to generate the second DAC code signal, and the counter circuit is further configured to increment the first and second shift registers.

Optionally, the digital LDO comprises a clock circuit configured to provide a clock signal to the comparison circuit.

Optionally, the first time period is a duration of time that the first digital to analog converter operates in the panic mode, the clock circuit is configured to operate in a fast mode during the panic mode by providing the clock signal at a first frequency, and operate in a slow mode, when not in the panic mode, by providing the clock signal at a second frequency, the second frequency being smaller than the first frequency.

Optionally, the clock circuit comprises a multiplexer for receiving an input clock signal and a frequency scaling unit, the clock circuit is configured to provide the input clock signal as the clock signal during the fast mode, and the frequency scaling unit is configured to reduce the frequency of the input clock signal in the generation of the clock signal during the slow mode.

Optionally, the second digital to analog converter is configured to generate the second DAC code signal using the clock signal as provided during the slow mode of operation of the clock circuit.

According to a second aspect of the disclosure there is provided a method of receiving a reference voltage and generating an output voltage using a digital low dropout regulator comprising a comparison circuit, a first digital to analog converter and a panic circuit, the method comprising receiving the reference voltage at the comparison circuit, receiving a feedback voltage at the comparison circuit, the feedback voltage being dependent on the output voltage, comparing the reference voltage and the feedback voltage using the comparison circuit, generating an error signal that is dependent on the comparison between the reference voltage and the feedback voltage using the comparison circuit, receiving the error signal at the first digital to analog converter operating in a panic mode, generating a first DAC code signal based on the error signal for a first time period, the output voltage being dependent on the first DAC code signal, using the first digital to analog converter operating in the panic mode, calculating a mean value of the generated first DAC code signal during at least a portion of the first time period using the first digital to analog converter operating in the panic mode, setting the first DAC code signal to the mean value as calculated, using the first digital to analog converter operating in the panic mode, detecting when the feedback voltage exceeds a first threshold value or falls below a second threshold value, using the panic circuit, and controlling the first digital to analog converter to operate in the panic mode when the feedback voltage exceeds the first threshold value or falls below the second threshold value, using the panic circuit.

It will be appreciated that the method of the second aspect may include features set out in the first aspect and can incorporate other features as described herein.

BRIEF DESCRIPTION OF THE DRAWINGS

The disclosure is described in further detail below by way of example and with reference to the accompanying drawings, in which:

FIG. 8*a* and FIG. 8*b* show a timing graph showing simulation results for a practical implementation of the LDO of FIG. 7*a* and FIG. 7*b*.

DETAILED DESCRIPTION

Figure 2A:
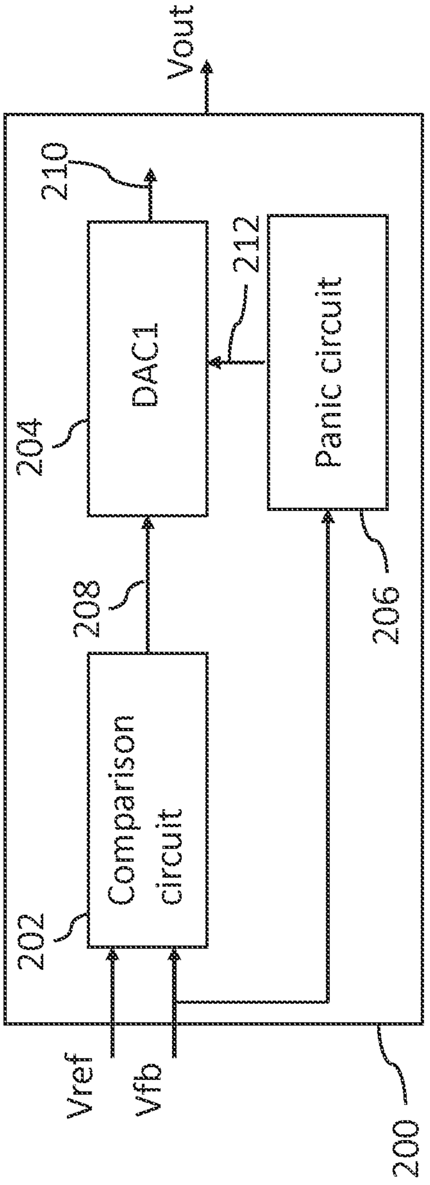
FIG. 2(*a*) is a schematic of a digital low dropout regulator (LDO) in accordance with a first embodiment of the present disclosure, FIG. 2(*b*) is a schematic of a digital LDO in accordance with a second embodiment of the present disclosure.
Figure 2B:
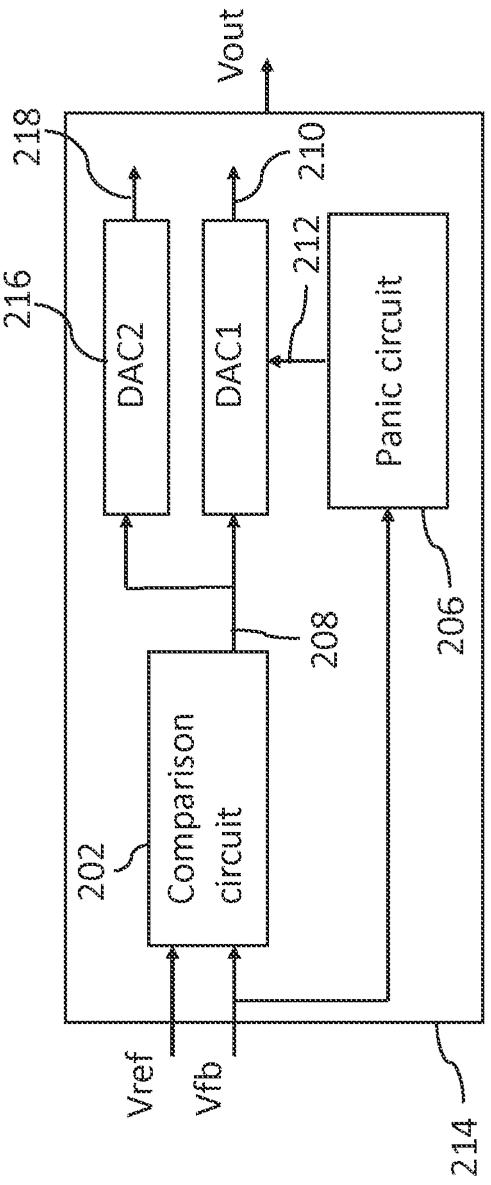

FIG. 2(*a*) is a schematic of a digital low dropout regulator (LDO) 200 in accordance with a first embodiment of the present disclosure. In operation the LDO 200 receives a reference voltage Vref and generates and output voltage Vout. The LDO 200 comprises a comparison circuit 202, a digital to analog converter 204 and a panic circuit 206.

During operation of the LDO 200, the comparison circuit 202 receives the reference voltage Vref and a feedback voltage Vfb. The feedback voltage Vfb is dependent on the output voltage Vout.

In a specific embodiment the feedback voltage Vfb may be the output voltage Vout, with the output voltage Vout being coupled to an input terminal of the comparison circuit 202.

In a further specific embodiment the feedback voltage Vfb may be generated from the output voltage Vout such that the feedback voltage Vfb is responsive to changes in the output voltage Vout. For example, the feedback voltage Vfb may be generated by providing the output voltage Vout to a potential divider, with an output of the potential divider being coupled to the input terminal of the comparison circuit 202. In such an example, the feedback voltage Vfb is then a fraction of the output voltage Vout, which may be necessary to reduce the voltage provided to the comparison circuit 202 to a suitable level for operation.

In operation, the comparison circuit 202 compares the voltages Vfb, Vref, and generates an error signal 208 that is dependent on the outcome of the comparison. In a specific embodiment, the comparison, for example, may be a subtraction of the reference voltage Vref from the Vfb such that the error signal 208 is equal to the feedback voltage Vfb minus the reference voltage Vref.

In a specific embodiment, the comparison circuit 202 may comprise a main comparator or a 1-bit analog to digital converter (ADC).

The DAC 204 is configured to be operable in a panic mode. Whilst operating in the panic mode, the DAC 204 receives the error signal 208 and generates a DAC code signal 210 for a time period. The output voltage Vout is dependent on the DAC code signal 210.

The time period may be a duration of time over which the DAC 204 operates in the panic mode. After the time period has elapsed, the DAC 204 may stop operating in the panic mode, and may, for example, switch to a normal mode of operation. Prior to entering the panic mode, the DAC 204 may operate in the normal mode of operation.

The DAC 204 is configured to calculate a mean voltage of the DAC code signal 210 during at least a portion of the time period. The DAC 204 is further configured to set the DAC code signal 210 to the mean value, as calculated.

For example, the DAC code signal 210 may vary periodically whilst the DAC 204 is operating in the panic mode. This may be indicative of limit cycling as discussed previously. To overcome this issue, the DAC 204 determines a mean value of the DAC code signal 210 over at least a portion of the time period that the DAC 204 is operating in the panic mode, and then sets the DAC code signal 210 to the mean value, thereby stopping the oscillation.

The DAC 204 may be configured to calculate the mean value of the DAC code signal 210 by measuring a peak and valley value of the DAC code signal 204, summing together the peak and valley values, and then dividing the sum by two.

The peak value may be measured by the DAC 204 during a falling edge of the error signal 208 as this is indicative of the DAC code signal 210 switching from a rising signal to a falling signal. The valley value may be measured by the DAC 204 during a rising edge of the error signal 208 as this is indicative of the DAC code signal 210 switching from a falling signal to a rising signal.

The peak value may be measured during the last falling edge of the error signal 208 before the end of the time period. The valley value may be measured during the last rising edge of the error signal 208 before the end of the time period.

During operation the panic circuit 206 controls the DAC 204 to operate in the panic mode when the DAC 204 detects that the feedback voltage Vfb either exceeds a first threshold value or falls below a second threshold value. Therefore, the panic circuit 206 effectively "switches" the DAC 204 to the panic mode when it detects the feedback voltage Vfb having a value outside of the range enclosed by the first and second threshold values.

The panic circuit 206 may output a panic signal 212 in response to the feedback voltage Vfb moving outside of the range enclosed by the threshold values, with the panic signal 212 being used to switch the DAC 204 to the panic mode.

FIG. 2(*b*) is a schematic of a digital LDO 214 in accordance with a second embodiment of the present disclosure. The LDO 214 shares features with the LDO 200 and further comprises a DAC 216. In the present embodiment, the DAC 216 receives the error signal 208 and generates a DAC code signal 218 based on the error signal 208, with the output voltage Vout being dependent on the DAC code signals 210, 218. The DAC 204 may provide course control of the output voltage Vout, for example as provided by the DAC 134 of FIG. 1(*a*). The DAC 216 may provide fine control of the output voltage Vout, for example as provided by the DAC 136 of FIG. 1(*b*).

Figure 3A:
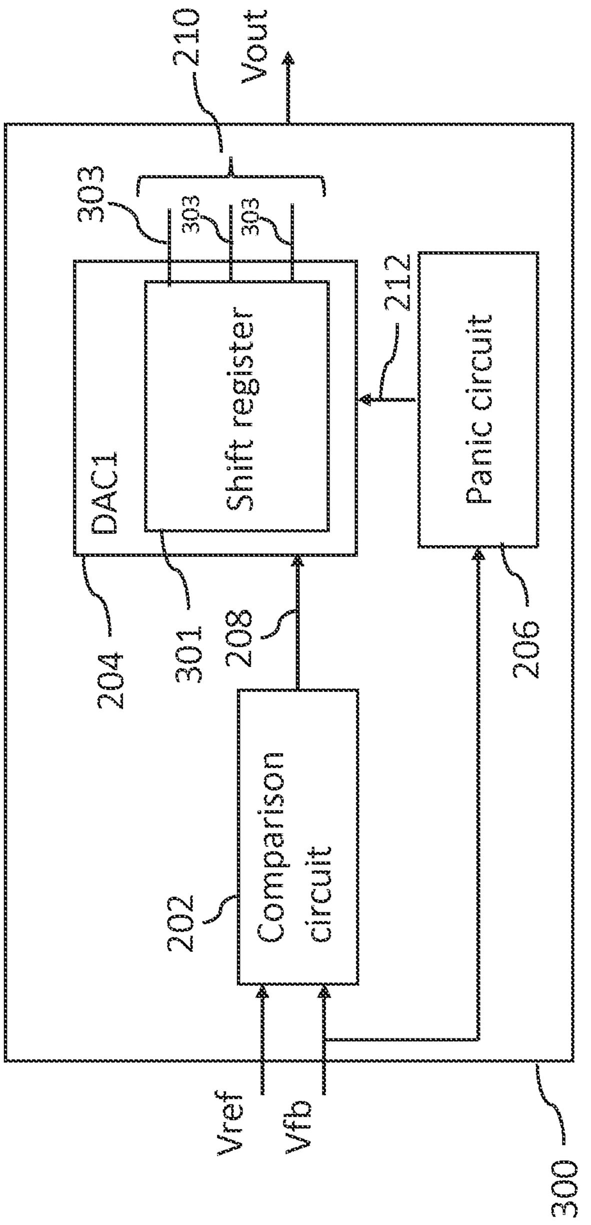
FIG. 3(*a*) is a schematic of an LDO in accordance with a third embodiment of the present disclosure, FIG. 3(*b*) is a schematic of an LDO in accordance with a fourth embodiment of the present disclosure.
Figure 3B:
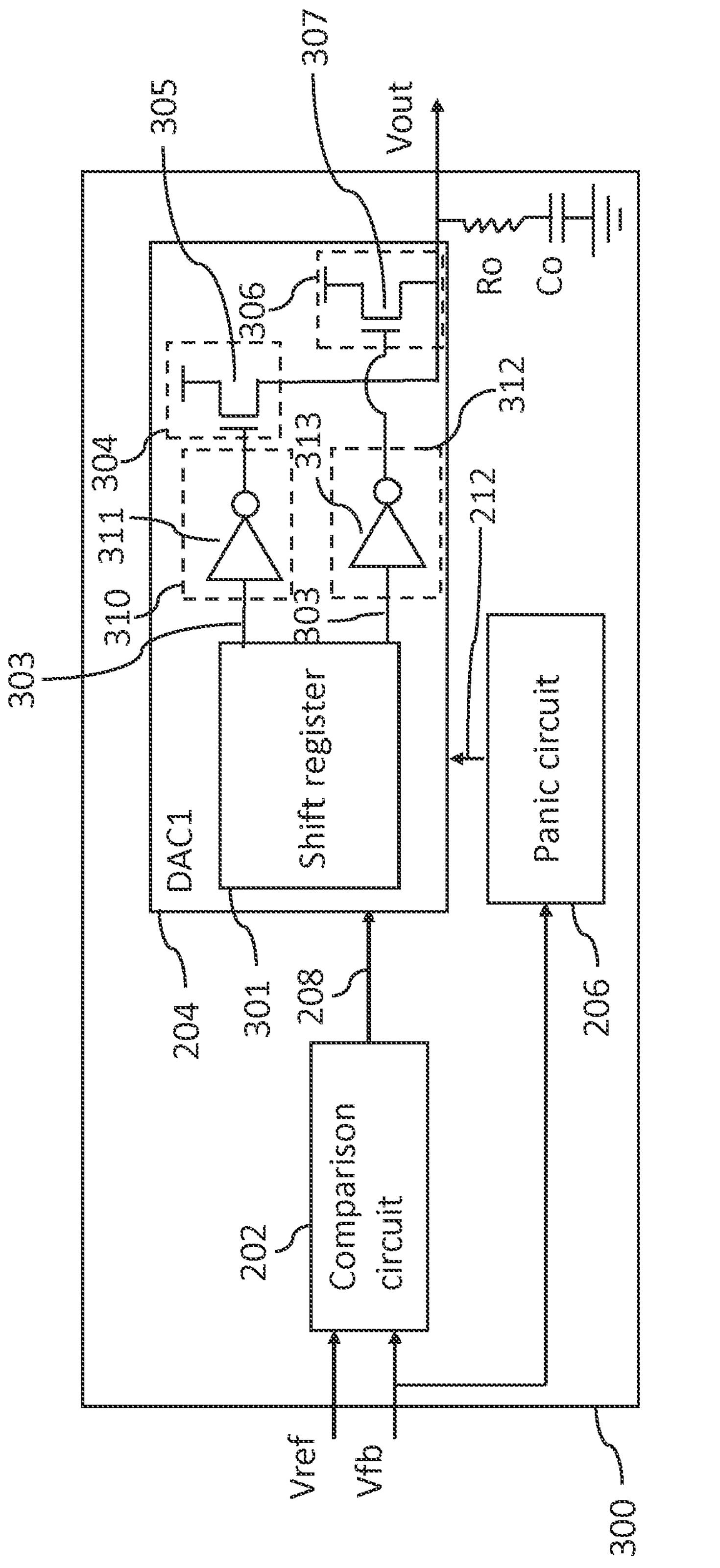

FIG. 3(*a*) is a schematic of an LDO 300 in accordance with a third embodiment of the present disclosure. The LDO 300 shares features with the LDO 200. In the present embodiment the DAC 204 comprises a shift register 301 that is configured to generate the DAC code signal 210.

A shift register is a digital circuit that incrementally shifts data from one storage location to another. The shift register may comprise an up-down counter that may, for example, be used to incrementally count up or down, with the output of the shift register being indicative of the presently stored value that increases or decreases incrementally during operation.

In the present embodiment, the shift register 301 provides a plurality of outputs 303, with each output having a binary value during operation and collectively forming the DAC code signal 210.

FIG. 3(*b*) is a schematic of an LDO 302 in accordance with a fourth embodiment of the present disclosure. The DAC 204 comprises current sources 304, 306 with each of the current sources 304, 306 functioning as a bit of the DAC code signal 210. In the present embodiment there is illustrated two current sources 304, 306. However, it will be appreciated that in further embodiments, the DAC 204 may comprise more than two current sources, with each current source functioning as a bit of the DAC code signal 210. Each of the current sources 304, 306 may comprise a transistor. In the present embodiment, the current source 304 comprises a transistor 305 and the current source 306 comprises a transistor 307.

Each of the outputs 303 is associated with a single bit of the DAC code signal 210 and is coupled to a gate of one of the transistors 305, 307.

The DAC 204 comprises buffer circuits 310, 312, with each of the outputs 303 being coupled to a gate via one of the buffer circuits 310, 312. The buffer circuits 310, 312 may each comprise an inverter. In the present embodiment, the buffer circuit 310 comprises an inverter 311 and the buffer circuit 312 comprises an inverter 313.

The LDO 302 may comprise an output capacitor Co having an equivalent series resistance (ESR) Ro, with the DAC signal 210 being provided to the output capacitor Co to generate the output voltage Vout. It should be noted that the resistor symbol denoted by Ro is an ESR of the capacitor Co and is therefore not a physical component that is separately implemented within the circuit.

Figure 4:
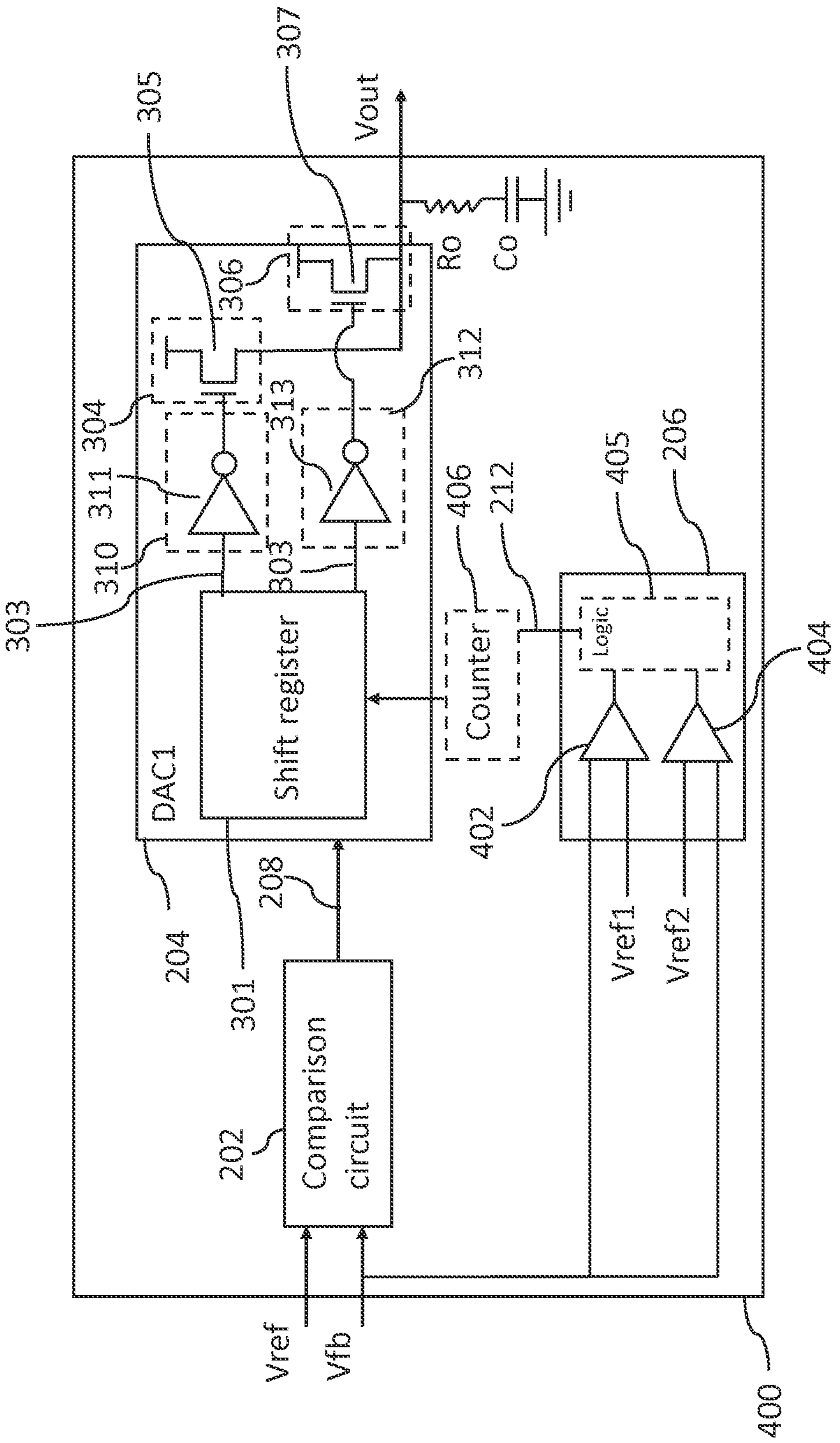
FIG. 4 is a schematic of a digital LDO in accordance with a fifth embodiment of the present disclosure.

FIG. 4 is a schematic of a digital LDO 400 in accordance with a fifth embodiment of the present disclosure. The LDO 400 shares features with the LDO 300. However, it will be appreciated that the features of the LDO 400 may be implemented with any of the digital LDO systems as described herein, in accordance with the understanding of the skilled person.

In the present embodiment, the panic circuit 206 comprises two comparators 402, 404. The comparator 402 receives the feedback voltage Vfb and compares the feedback voltage Vfb to a first threshold value (as provided by the reference voltage Vref1). The comparator 404 receives the feedback voltage Vfb and compares the feedback voltage Vfb to a second threshold value (as provided by the reference voltage Vref2).

The panic circuit 206 may further comprises a logic circuit 405 that is configured to receive outputs of the comparators 402, 404 and to provide the panic signal 212 in response to the comparator outputs indicating that the feedback voltage Vfb has moved outside the voltage range enclosed by the threshold values provided by Vref1 and Vref2.

The LDO 400 may further comprise a counter circuit 406 that is configured to receive the panic signal 212. The counter circuit 406 may also receive the error signal 208. During operation, the counter circuit 406 is configured to increment the shift register 301 during the time period. As discussed previously, the time period may be a duration of time over which the DAC 204 operates in the panic mode.

For example, when the comparators 402, 404 detect that the feedback voltage Vfb is outside the operating window defined by the threshold values provided by Vref1, Vref2, the logic circuit 405 responds by providing the panic signal 212 the counter circuit 406. The feedback voltage Vfb may move outside the operating window, for example, when a load transient occurs that results in an unwanted variation in the output voltage Vout. The counter circuit 406 then increments the shift register 301 to increment the DAC code signal 210 to restore the output voltage Vout to its intended value as defined by the reference voltage Vref.

Figure 5B:
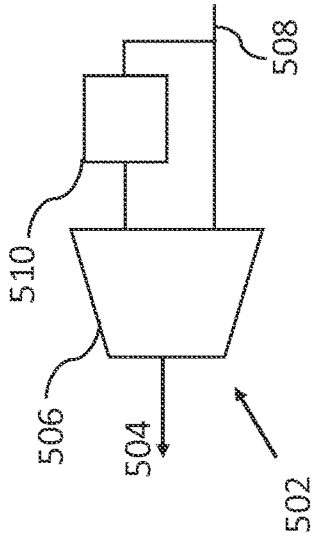
FIG. 5(*a*) is a schematic of a digital LDO in accordance with a sixth embodiment of the present disclosure, FIG. 5(*b*) is a schematic of an example specific implementation of the clock circuit.
Figure 5A:
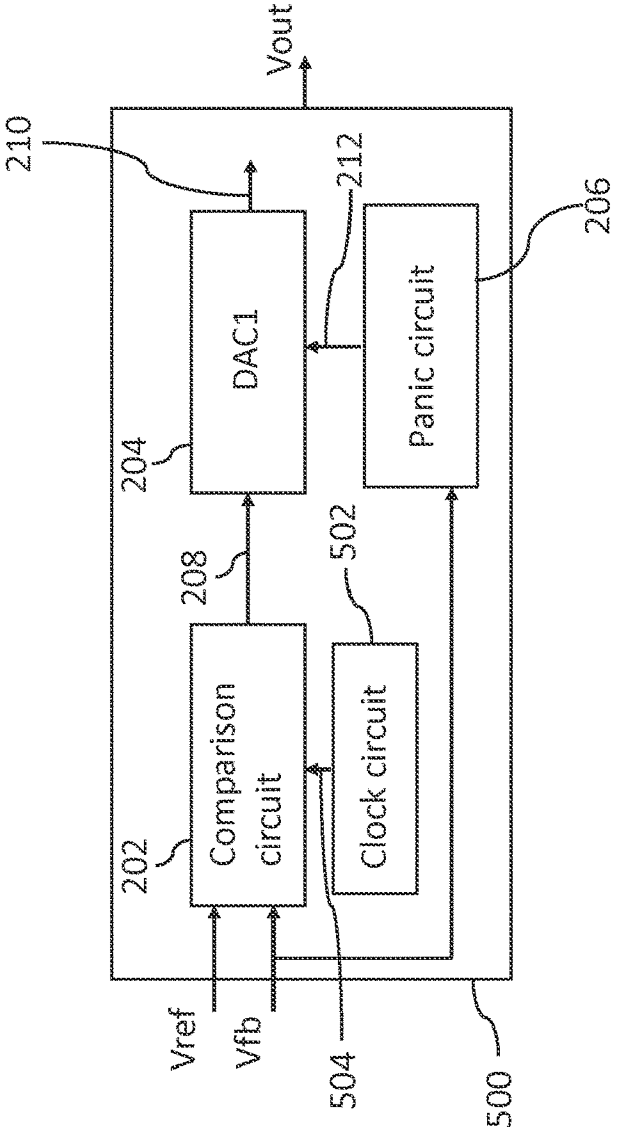

FIG. 5(*a*) is a schematic of a digital LDO 500 in accordance with a sixth embodiment of the present disclosure. The LDO 500 shares features with the LDO 200. However, it will be appreciated that the features of the LDO 500 may be implemented with any of the digital LDO systems as described herein, in accordance with the understanding of the skilled person.

In the present embodiment, the LDO 500 comprises a clock circuit 502 configured to provide a clock signal 504 to the comparison circuit 202. The clock circuit 502 may be configured to operate in a fast mode during the panic mode by providing the clock signal 502 at a first frequency and operate in a slow mode, when not in the panic mode, by providing the clock signal 504 at a second frequency. The second frequency is smaller than the first frequency.

FIG. 5(*b*) is a schematic of an example specific implementation of the clock circuit 502. The clock circuit 502 comprises a multiplexer 506 for receiving an input clock signal 508 and a frequency scaling unit 510. The clock circuit 502 is configured to provide the input clock signal 508 as the clock signal 504 during the fast mode, and the frequency scaling unit 510 is configured to reduce the frequency of the input clock signal 508 in the generation of the clock signal 504 during the slow mode.

Figure 6:
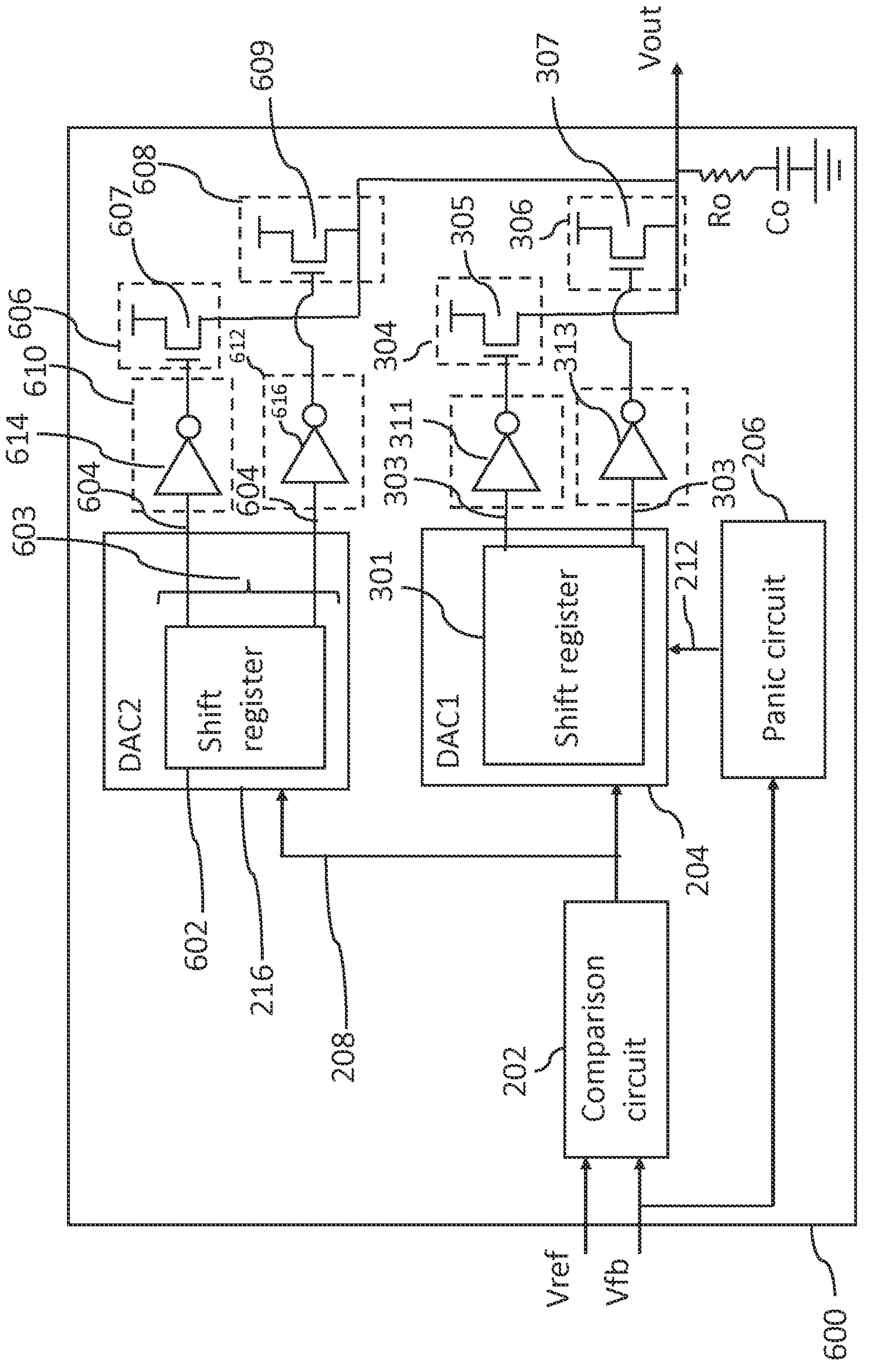
FIG. 6 is a schematic of a digital LDO in accordance with a seventh embodiment of the present disclosure.

FIG. 6 is a schematic of a digital LDO 600 in accordance with a seventh embodiment of the present disclosure. In the present example, the DAC 216 comprises a shift register 602 for generating a DAC signal 604. The shift register 602 may comprise an up-down counter. The DAC 216 may comprise a plurality of current sources, with two current sources 606, 608 being provided in the current embodiment. The current sources 606, 608 each function as a bit of the DAC code signal 604. Each of the current sources 606, 608 comprises a transistor 607, 609.

The shift register 602 may comprise a plurality of outputs 603, each output being associated with a single bit of the DAC code signal 604 and coupled to a gate of one of the plurality of current sources 606, 608.

The DAC 216 may comprise a plurality of buffer circuits 610, 612 with each output 603 being coupled to the gate of one of the second current sources 606, 608 via one of the buffer circuits 610, 612. Each of the buffer circuits 610, 612 may comprise an inverter 614, 616.

In the present embodiment, the DAC code signals 210, 604 are both provided to the output capacitor Co to generate the output voltage Vout.

It will be appreciated that in a specific embodiment, the panic circuit 206 may be implemented, as described in FIG. 4 and the LDO 600 may comprise the counter circuit 406, as described in FIG. 4. The counter circuit 406 may increment both shift registers 301, 602. Furthermore, there may be provided the clock circuit 502 that functions as described in relation to FIG. 5(*a*). The DAC 216 may generate the DAC code signal 604 using the clock signal 504, for example, as provided during the slow mode of operation. In summary, for a specific embodiment of the LDO 600, during the fast mode of operation of the clock circuit 502 (during the panic mode of the DAC 204) the DAC 204 is configured to calculate the mean value of the DAC code signal 210 by measuring a peak and valley value of the DAC code signal 204, summing together the peak and valley values, and then dividing the sum by two. The time period over which the fast mode is active may be referred to as the "fast" clocking period. The operation of determining the mean may be carried out at the end of the fast clock period and using the last maximum and minimum values of the DAC code signals 204 that occur during the fast clock period for the calculation of the mean value. The DAC 204 then sets the DAC code signal 210 to the mean value, as calculated, thereby providing a rapid recovery, and fast settling to a steady state output, when a transient load is applied.

Figure 7A:
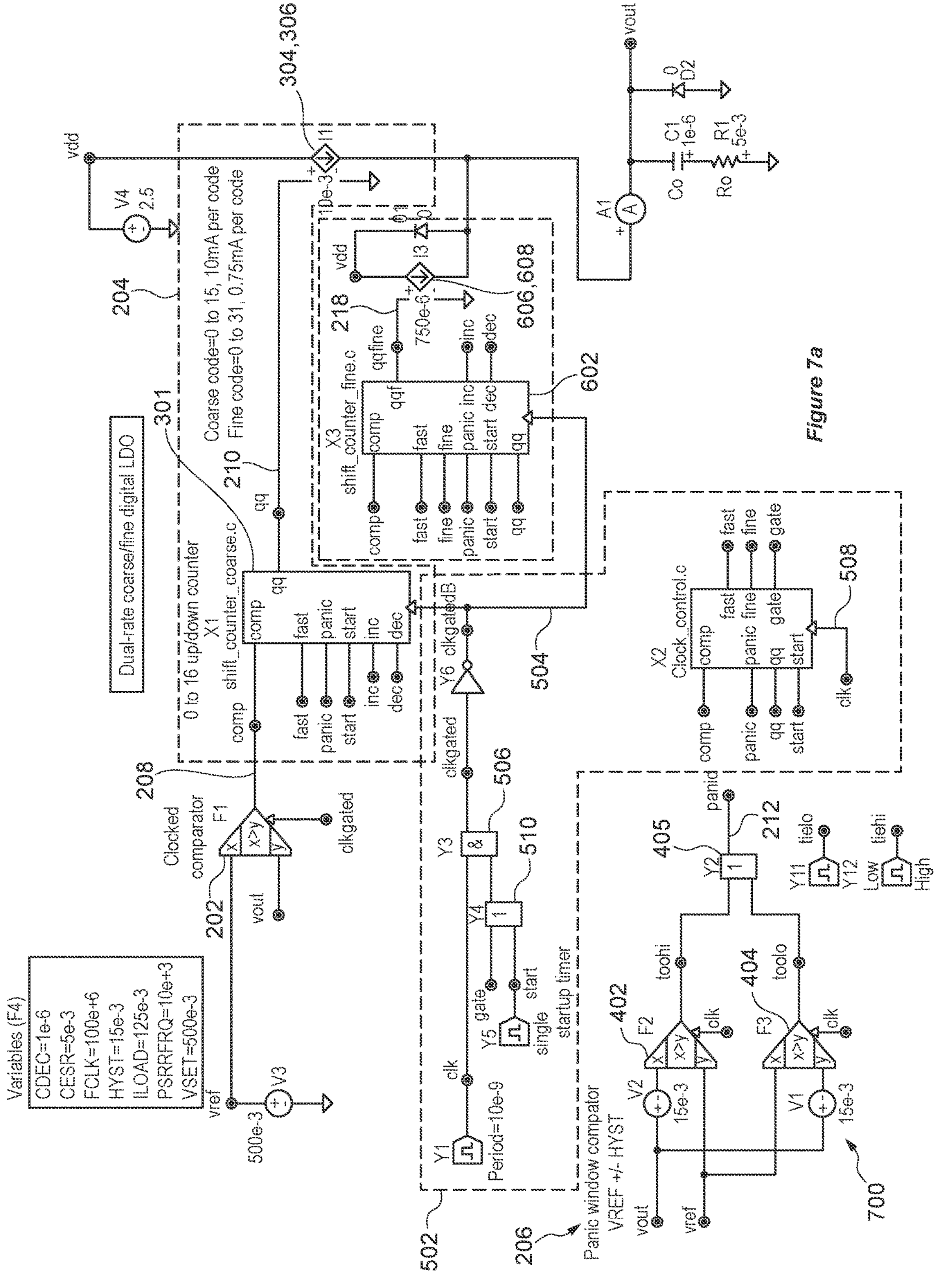
FIG. 7*a* and FIG. 7*b* show a schematic of a digital LDO in accordance with an eighth embodiment of the present disclosure.
Figure 7B:
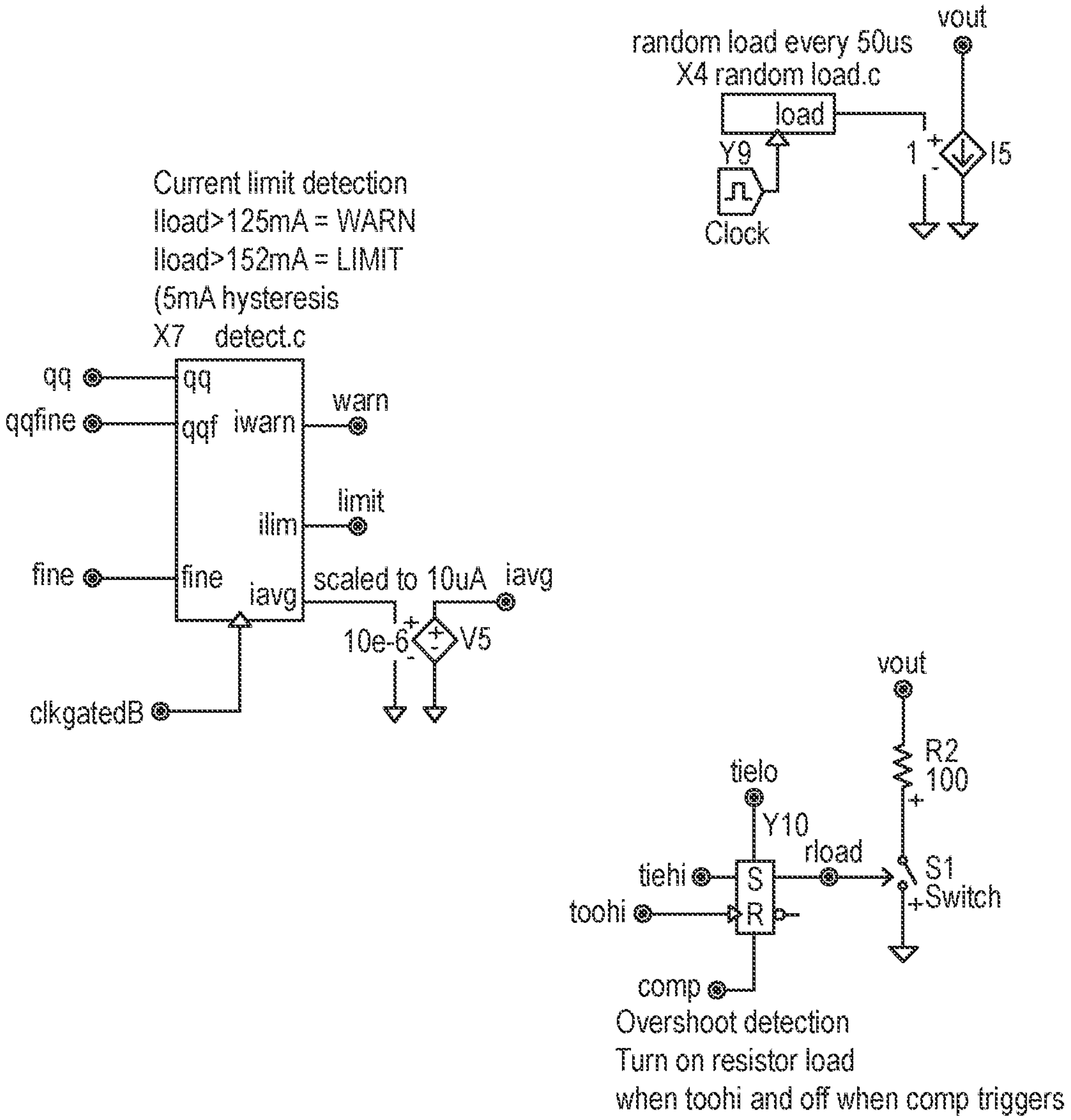

FIG. 7*a* and FIG. 7*b* show a schematic of a digital LDO 700 in accordance with an eighth embodiment of the present disclosure. The digital LDO 700 comprises the following components:

- Clocked comparator (relating to the comparison circuit 202, as described previously). During operation, the clocked comparator 202 compares the target 'vref' voltage (previously labelled Vref) with the output 'vout' voltage (previously labelled Vout) and produces a 'csomp' signal (previously referred to as the error signal 208) that is used by the coarse up-down counter (relating to a specific embodiment of the shift register 301) and the fine up-down counters (relating to a specific embodiment of the shift register 602).
- Panic comparators (relating to the specific implementation of the panic circuit 206). These form a window comparator and provides an output that is indicative of whether the output voltage vout is too high 'toohi' or too low 'toolo'. These are used to form the 'panic'.
- Shift_counter_coarse (previously described in relation to the shift register 301). In the present embodiment, this is a 4-bit up-down counter that controls the large coarse stepped DAC 204. In the current embodiment, each bit 304, 306 of the DAC 204 is a 10 mA current source, i.e. 0 to 150 mA output.
- Shift_counter_fine (previously described in relation to the shift register 602). In the present embodiment, this is a 5-bit up-down counter that controls the small fine stepped DAC 216. Each bit 606, 608 of the DAC 216 is a 750 μA current source, i.e. 0 to 23.23 mA output. The fine DAC 216 is scaled to be approximately 2.2 times larger than the coarse step. When the up-down counter 602 reaches the limit (31 or 0) it indicates a increment ('inc') or decrement ('dec') to the coarse counter 204 so that it remains within its controllable region. For example, when the upper limit of 31 is hit, an increment of the coarse DAC 204 adds 10 mA, so the fine DAC subtracts the nearest of 9.25 mA, or 12 codes, so that the next output current increases by 1 fine DAC 216 step of 0.75 mA. This allows the control loop to accommodate slowly changing loads without triggering a 'panic'.
- Clock_control (previously described in relation to the clock circuit 502). In the present embodiment, the clock circuit 502 controls the duration of the panic mode signals ('fast' and 'fine') and divides the system clock for the slower fine control mode, by gating the clock every 16 cycles ('gate'), so the 'fine' mode runs at 1/16th of the clock speed.
- Detect. This is a telemetry block that warns and indicates when the output current is reaching its maximum ('warn' and 'limit') using the coarse and fine DAC codes ('qq' and 'qqfine'). There is also a measurement of the output current, using a IIR filter and the DAC codes.
- Overshoot detection. This is a RS latch triggered pull-down resistor, used when the VOUT is above the 'tooHi' threshold. If the load current drops (say to zero) this is the active mechanism to discharge the output capacitor Co. In a further embodiment, tt can also be used to discharge the output when the LDO is turned off.

Figure 8A:
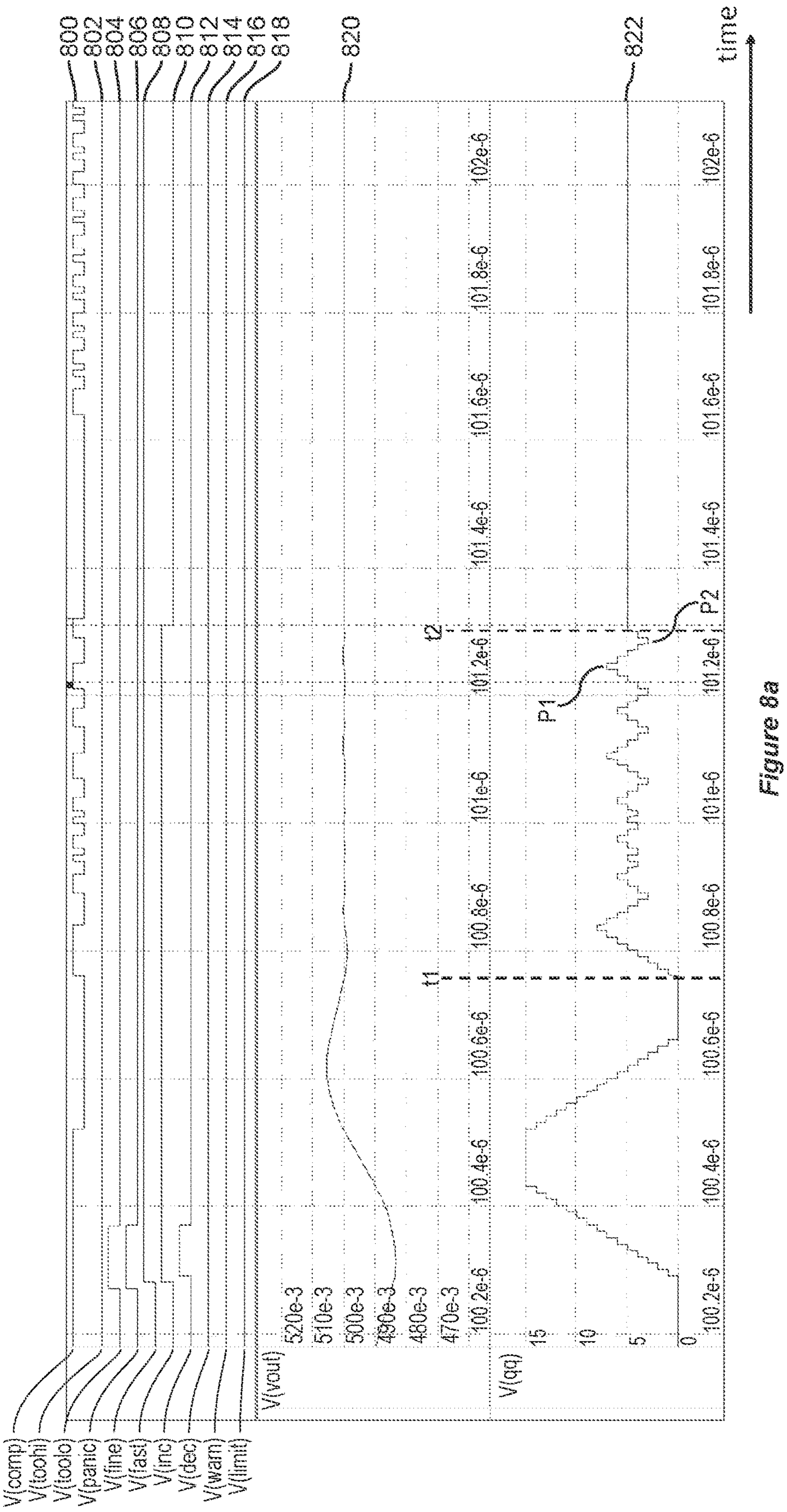

FIG. 8*a* and FIG. 8*b* show a timing graph showing simulation results for a practical implementation of the LDO 700 of FIG. 7*a* and FIG. 7*b*. In FIG. 8*a* and FIG. 8*b*, there is shown the error signal 208 (a trace 800), the "toohi" signal (a trace 802), the "toolo" signal (a trace 804), the panic signal 212 (a trace 806), the “fast” signal (a trace 808), the “fine” signal (a trace 810), the increment “inc” signal (a trace 812), the decrement “dec” signal (a trace 814), the “warn” signal (a trace 816), the “limit” signal (a trace 818), the output voltage vout (a trace 820), the DAC code signal 210 (a trace 822).

Figure 1A:
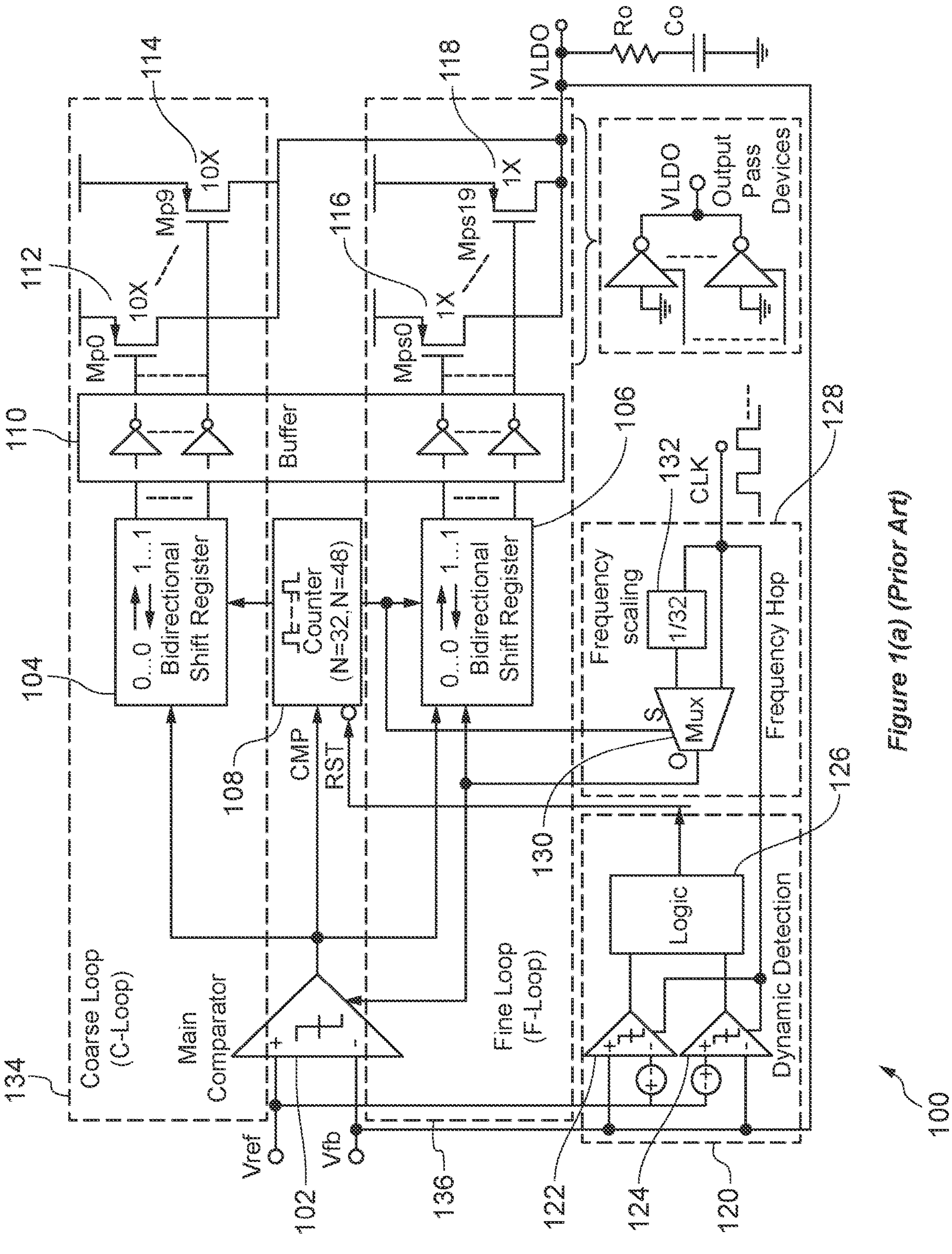
Figure 1(a) (Prior Art)
FIG. 1(*a*) shows a digital LDO as is known in the prior art, FIG. 1(*b*) is a schematic of a current mirror scheme for controlling course and fine DAC outputs as is known in the prior art.
Figure 1B:
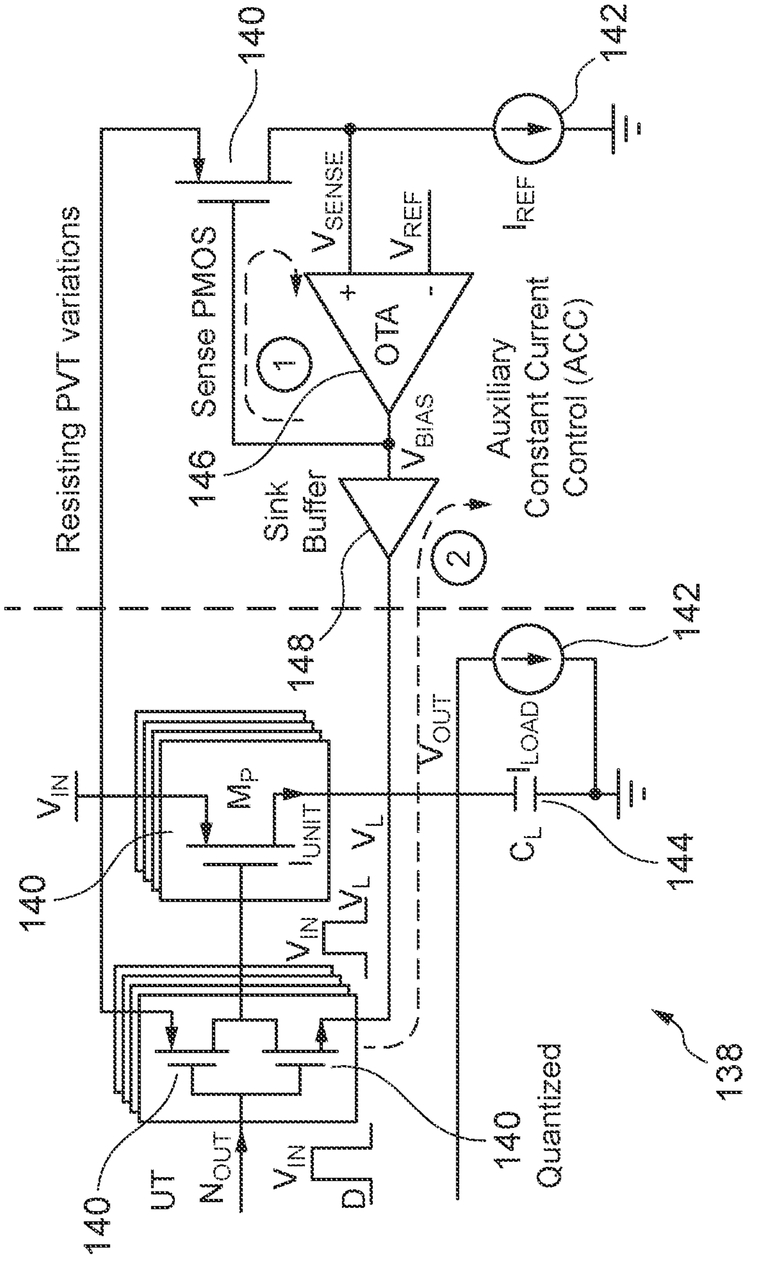
Figure 1(b) (Prior Art)

It will be appreciated that when the “fast” signal is in a high state, the DAC 204 is operating in the panic mode. When the system detects a ‘panic’, the ‘fast’ signal indicates that the CLK is operating at full speed and the up-down counter 301 is controlled by the comparator 202. This allows the output current to adjust to a transient load change, but in the prior art systems (for example, as is shown in FIG. 1(*a*)) the stability of the system results in a limit cycling of the DAC code signal 210, as occurs from t1 to t2.

In the present embodiment, and with reference to FIG. 7*a* and FIG. 7*b*, the clock control 502 indicates ‘fast’ for the following conditions:

1. 5 comparator edges (as shown by the trace 800)+31 extra clock cycles
2. For less than 5 comparator edges (as shown by the trace 800), a maximum of 127 clock cycles.

Whilst the ‘fast’ signal is indicated, the maximum and minimum of each up-down counter 301 value is captured. This is achieved by capturing the value on the rising (minimum) and falling (maximum) edge of the comparator ‘comp’ signal (being the error signal 208 as previously discussed).

At the end of the ‘fast’ period, the mean value is set as a “best guess” of the required DAC code signal 210. As given by:

$$QQ = (\max + \min)/2 \tag{1}$$

where QQ is the DAC code signal 210, max denotes the peak of the DAC code signal 210 prior to the end of the panic mode (at point P1 on FIG. 8*a*), and min denotes the valley of the DAC code signal 210 prior to the end of the panic mode (at point P2 on FIG. 8*a*). Equation (1) uses integer mathematics, so the divide by 2 is a right shift by 1. For example, if max=12 and min=5, then:

$$QQ = (12 + 5)/2 = 8 \tag{2}$$

The advantage of the technique describe herein is that it enables the reduction and/or elimination of the coarse DAC limit cycling, which settles the output to a steady state faster, for what is inherently an unstable loop-stability criterion.

The simulation results presented in FIG. 8*a* shows a ‘panic’ event, where the coarse counter ramps up then down on the COMP signal (the trace 800). The ‘fast’ signal continues for 5 COMP edges+31 clocks.

For the last limit cycle before the ‘fast’ signal goes low, the values are max=7 (at point P1) and min=3 (at point P2). This results in the value DAC signal 210 being set 5 to after P2 and in accordance with equation (1).

Figure 9:
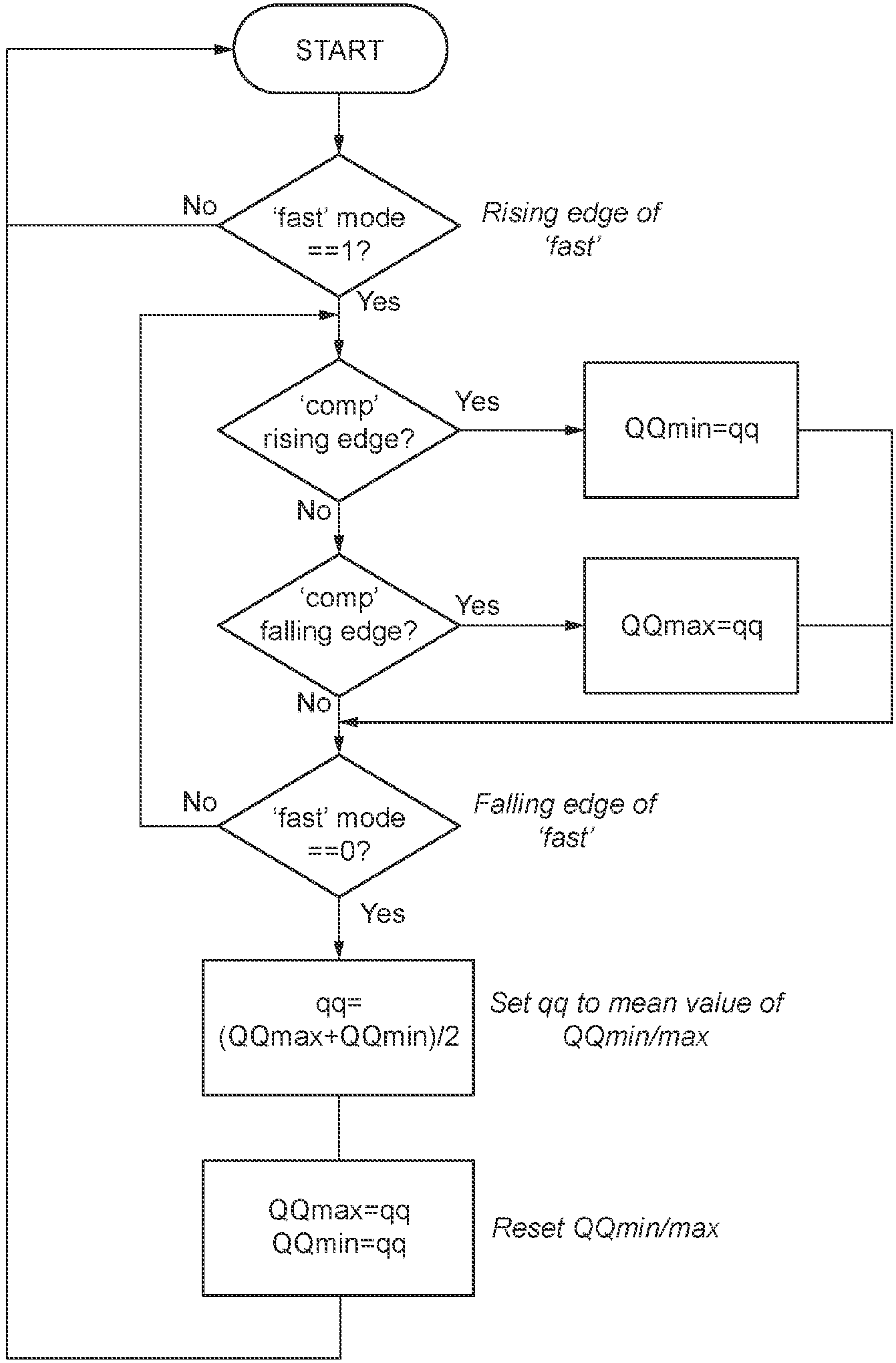
FIG. 9 is a flow diagram showing an algorithm that captures that minimum and maximum DAC code signal values whilst the LDO is operating in the "fast" mode.

FIG. 9 is a flow diagram 900 showing an algorithm that captures that minimum and maximum DAC code signal 210 values whilst the LDO 700 is operating in the “fast” mode. This is a generalised algorithmic representation of the process illustrated by the simulation results presented in FIG. 8*a*.

The following is example C-code for the coarse DAC up-down counter in accordance with embodiments of the present disclosure.

```
//
// shift register counter
// coarse DAC control
// qq=0 to 15
//
int qqmax, qqmin;
int qqlim;
bool compnew, fastnew;
bool compold, fastold; //to find edges
bool panicnew;
init( )
{
  qq=0;
  //internal
  qqmax=0;
  qqmin=15;
  //startup current limit
  qqlim=3;
}
main( )
{
    //boolean inputs
    //shifts of inputs to get edges
    compold = compnew;
    fastold = fastnew;
    fastnew = ishigh(fast);
    compnew = ishigh(comp);
    panicnew = ishigh(panic);
    //in fast mode find comp edges
    //and grab qq min/max values
    if((fastnew && compnew && !compold) || panicnew)
      qqmin=qq;
    if((fastnew && !compnew && compold) || panicnew)
      qqmax=qq;
    //if fast & comp==1 increment, else decrement
    //no wrapping
    if(fastnew) qq += compnew ? 1 : -1;
    //on falling edge of 'fast', set to mean of qqmax/min
    //reset min/max
    if(!fastnew && fastold)
    {
      qq = floor((qqmax+qqmin)/2);
      qqmax=qq;
      qqmin=qq;
    }
    //shift code up/down from fine loop
    if(!fastnew && ishigh(inc)) qq++;
    if(!fastnew && ishigh(dec)) qq—;
    //output qq, bound checked
    qq = limit(qq,0,qqlim);
    //startup ends on COMP=edge(H->L) or timeout
    if(islow(start) || (!compnew && compold)) qqlim=15;
```

The following portion of the above C-code may be used to find gg min/max values on comparator edges:

```
//in fast mode find comp edges
//and grab qq min/max values
if((fastnew && compnew && !compold) || panicnew)
  qqmin=qq;
if((fastnew && !compnew && compold) || panicnew)
  qqmax=qq;
```

The following portion of the above C-code may be used to apply mid-value current at falling edge of “fast”:

```
//on falling edge of 'fast', set to mean of qqmax/min
  //reset min/max
  if(!fastnew && fastold)
  {
    qq = floor((qqmax+qqmin)/2);
```

-continued

```
        qqmax=qq;
        qqmin=qq;
    }
```

It will be appreciated that common reference numerals and common variables between Figures represent common features.

Various improvements and modifications can be made to the above without departing from the scope of the disclosure.

The invention claimed is:

1. A digital low dropout regulator (LDO) for receiving a reference voltage and generating an output voltage comprising:

a comparison circuit configured to:
 i) receive the reference voltage;
 ii) receive a feedback voltage, the feedback voltage being dependent on the output voltage;
 iii) compare the reference voltage and the feedback voltage; and
 iv) generate an error signal that is dependent on the comparison between the reference voltage and the feedback voltage;

a first digital to analog converter configured to be operable in a panic mode in which the first digital to analog converter is configured to:
 i) receive the error signal;
 ii) generate a first DAC code signal based on the error signal for a first time period, the output voltage being dependent on the first DAC code signal; and
 iii) calculate a mean value of the generated first DAC code signal during at least a portion of the first time period; and
 iv) set the first DAC code signal to the mean value as calculated;

a panic circuit configured to:
 i) detect when the feedback voltage exceeds a first threshold value or falls below a second threshold value; and
 ii) control the first digital to analog converter to operate in the panic mode when the feedback voltage exceeds the first threshold value or falls below the second threshold value.

2. The digital LDO of claim 1, wherein the first digital to analog converter comprises a first shift register configured to generate the first DAC code signal.

3. The digital LDO of claim 2, wherein the first digital to analog converter comprises a plurality of first current sources, wherein each of the first current sources functions as a bit of the first DAC code signal.

4. The digital LDO of claim 3, wherein each of first current sources comprises a first transistor.

5. The digital LDO of claim 4, wherein the first shift register comprises a plurality of outputs, each output being associated with a single bit of the first DAC code signal and coupled to a gate of one of the plurality of first transistors.

6. The digital LDO of claim 5, wherein the first digital to analog converter comprises a plurality of first buffer circuits, each output being coupled to the gate of one of the plurality of first transistors via a buffer circuit.

7. The digital LDO of claim 1, wherein the first time period is a duration of time that the first digital to analog converter operates in the panic mode.

8. The digital LDO of claim 1, wherein the first digital to analog converter is configured to calculate the mean value of the generated first DAC code signal by:

measuring a peak value of the generated first DAC code signal;

measuring a valley value of the generated first DAC code signal; and summing together the peak and valley values and dividing the sum of the peak and valley values by two.

9. The digital LDO of claim 8, wherein the peak value of the generated first DAC code signal is measured during a falling edge of the error signal and/or the valley value of the generated first DAC code signal is measured during a rising edge of the error signal.

10. The digital LDO of claim 9, wherein the peak value is measured during the last falling edge of the error signal before the end of the first time period and/or the valley value is measured during the last rising edge of the error signal before the end of the first time period.

11. The digital LDO of claim 1, wherein the panic circuit is configured to output a panic signal in response to the detection of the feedback voltage exceed the first threshold value or falling below the second threshold value, the panic signal being used to switch the first digital to analog converter to the panic mode.

12. The digital LDO of claim 11, wherein the panic circuit comprises a first comparator configured to compare the feedback voltage with the first threshold value and a second comparator configured to compare the feedback voltage with the second threshold value.

13. The digital LDO of claim 12, wherein the panic circuit comprises a logic circuit configured to receive outputs of the first and second comparators and to provide the panic signal in response to the first and second comparator outputs indicating that the feedback voltage has exceeded the first threshold value or has fallen below the second threshold value.

14. The digital LDO of claim 11, comprising:

a counter circuit configured to receive the panic signal and the error signal; wherein:

the first digital to analog converter comprises a first shift register configured to generate the first DAC code signal; and the counter circuit is further configured to increment the first shift register during the first time period.

15. The digital LDO of claim 1 comprising a clock circuit configured to provide a clock signal to the comparison circuit.

16. The digital LDO of claim 15, wherein:

the first time period is a duration of time that the first digital to analog converter operates in the panic mode;

the clock circuit is configured to:
 i) operate in a fast mode during the panic mode by providing the clock signal at a first frequency; and
 ii) operate in a slow mode, when not in the panic mode, by providing the clock signal at a second frequency, the second frequency being smaller than the first frequency.

17. The digital LDO of claim 16, wherein:

the clock circuit comprises a multiplexer for receiving an input clock signal and a frequency scaling unit;

the clock circuit is configured to provide the input clock signal as the clock signal during the fast mode; and the frequency scaling unit is configured to reduce the frequency of the input clock signal in the generation of the clock signal during the slow mode.

18. The digital LDO of claim 1 comprising a second digital to analog converter configured to:

i) receive the error signal; and ii) generate a second DAC code signal based on the error signal, the output voltage being dependent on the second DAC code signal.

19. The digital LDO of claim 18, wherein the first digital to analog converter provides course control of the output voltage and the second digital to analog converter provides fine control of the output voltage.

20. A method of receiving a reference voltage and generating an output voltage using a digital low dropout regulator comprising a comparison circuit, a first digital to analog converter and a panic circuit, the method comprising:

receiving the reference voltage at the comparison circuit;

receiving a feedback voltage at the comparison circuit, the feedback voltage being dependent on the output voltage;

comparing the reference voltage and the feedback voltage using the comparison circuit;

generating an error signal that is dependent on the comparison between the reference voltage and the feedback voltage using the comparison circuit;

receiving the error signal at the first digital to analog converter operating in a panic mode;

generating a first DAC code signal based on the error signal for a first time period, the output voltage being dependent on the first DAC code signal, using the first digital to analog converter operating in the panic mode;

calculating a mean value of the generated first DAC code signal during at least a portion of the first time period using the first digital to analog converter operating in the panic mode;

setting the first DAC code signal to the mean value as calculated, using the first digital to analog converter operating in the panic mode;

detecting when the feedback voltage exceeds a first threshold value or falls below a second threshold value, using the panic circuit; and controlling the first digital to analog converter to operate in the panic mode when the feedback voltage exceeds the first threshold value or falls below the second threshold value, using the panic circuit.

* * * * *